United States Patent
Kiik et al.

(10) Patent No.: US 6,708,456 B2
(45) Date of Patent: Mar. 23, 2004

(54) ROOFING COMPOSITE

(75) Inventors: Matti Kiik, Richardson, TX (US); Allen Mclintock, Grapevine, TX (US); Michael Bryson, Blue Springs, MO (US); Kevin L. Beattie, Plano, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 36 days.

(21) Appl. No.: 10/211,663

(22) Filed: Aug. 2, 2002

(65) Prior Publication Data

US 2003/0032356 A1 Feb. 13, 2003

Related U.S. Application Data

(63) Continuation-in-part of application No. 10/212,012, filed on Aug. 2, 2002, and a continuation-in-part of application No. 09/897,308, filed on Jul. 2, 2001, and a continuation-in-part of application No. 09/663,255, filed on Sep. 15, 2000, now Pat. No. 6,586,353.

(60) Provisional application No. 60/331,808, filed on Nov. 20, 2001, provisional application No. 60/310,031, filed on Aug. 3, 2001, and provisional application No. 60/168,057, filed on Sep. 15, 2000.

(51) Int. Cl.[7] .............................. E04B 1/00; E04C 1/00; B32B 27/04

(52) U.S. Cl. .............................. 52/98; 52/100; 52/314; 52/555; 52/557; 428/141; 428/357; 442/64; 442/65; 442/68; 442/136; 442/172; 442/320

(58) Field of Search .............................. 442/64, 65, 68, 442/136, 172, 320; 428/141, 357; 52/98, 100, 314, 555, 557

(56) References Cited

U.S. PATENT DOCUMENTS 74,606 A 2/1868 Schanck (List continued on next page.)

FOREIGN PATENT DOCUMENTS

| DE | 289082 | 4/1991 |
|---|---|---|
| DE | 19729533 | 1/1999 |
| EP | 0316655 | 5/1971 |
| EP | 0316655 | 5/1989 |
| EP | 764748 | 3/1997 |
| GB | 926749 | 5/1963 |
| GB | 1228592 | 5/1971 |
| GB | 2167060 | 5/1986 |
| RU | 564374 | 7/1977 |
| WO | 8701474 | 1/1988 |
| WO | WO 9900338 | 1/1999 |
| WO | WO 0163986 | 8/2001 |

OTHER PUBLICATIONS

Correspondence from Elk Corporation to Fontana Paper Mill dated Jul. 30, 1999 and Aug. 19, 1999, including a copy of the Confidentiality Agreement executed between these two parties covering three samples supplied by Elk to Fontana Paper Mill for confidential evaluation.

(List continued on next page.)

*Primary Examiner*—Elizabeth M. Cole
*Assistant Examiner*—Norca L. Torres
(74) *Attorney, Agent, or Firm*—Baker Botts LLP

(57) ABSTRACT

A roofing composite comprising a roofing material and an interply material attached to the roofing material. The interply material is attached adjacent to an edge of the roofing material and is scored to permit a major portion of the interply material to be folded away from the roofing material for application to a roof. The roofing material may be a roofing shingle or roll roofing and the interply material is comprised of a water resistant material.

21 Claims, 7 Drawing Sheets

U.S. PATENT DOCUMENTS

| | | | |
|---|---|---|---|
| 79,645 A | 7/1868 | Ferguson | |
| 83,539 A | 10/1868 | Pinner | |
| 1,447,290 A | 3/1923 | Fischer | |
| 1,601,731 A | 10/1926 | Flood | |
| 1,619,600 A | 3/1927 | Cumper | |
| 1,722,702 A | 7/1929 | Kirschbraun et al. | |
| 2,097,845 A | 11/1937 | Snow | |
| 2,160,845 A | 6/1939 | Eason | |
| 2,305,008 A | 12/1942 | Howard | |
| 3,603,221 A | 9/1971 | Barton et al. | |
| 3,616,173 A | 10/1971 | Green et al. | |
| 3,624,975 A | 12/1971 | Morgan et al. | |
| 3,634,293 A | 1/1972 | Bonitz | |
| 3,665,667 A | 5/1972 | Oberley et al. | 52/556 |
| 3,721,578 A | 3/1973 | Bennett et al. | |
| 3,841,885 A | 10/1974 | Jakel | |
| 3,921,358 A | 11/1975 | Bettoli | |
| 3,954,555 A | 5/1976 | Kole et al. | |
| 3,992,340 A | 11/1976 | Bonitz | |
| 4,044,188 A | 8/1977 | Segal | |
| 4,073,997 A | 2/1978 | Richards et al. | |
| 4,079,158 A | 3/1978 | Kennepohl et al. | |
| 4,082,885 A | 4/1978 | Rashid et al. | |
| 4,130,516 A | 12/1978 | Gagle et al. | |
| 4,135,022 A | 1/1979 | Kennepohl et al. | |
| 4,186,236 A | 1/1980 | Heitmann | |
| 4,212,912 A | 7/1980 | Wartusch et al. | |
| 4,212,913 A | 7/1980 | Auten | |
| 4,214,032 A | 7/1980 | Csikós et al. | |
| 4,229,329 A | 10/1980 | Bennett | |
| 4,265,962 A | 5/1981 | May | |
| 4,273,685 A | 6/1981 | Marzocchi et al. | |
| 4,291,086 A | 9/1981 | Auten | |
| 4,306,911 A | 12/1981 | Gordon et al. | |
| 4,313,968 A | 2/1982 | Sickles et al. | |
| 4,331,726 A | 5/1982 | Cleary | |
| 4,332,705 A | 6/1982 | Uffner | |
| 4,388,366 A | 6/1983 | Rosato et al. | |
| 4,399,186 A | 8/1983 | Lauderback | |
| 4,405,680 A | 9/1983 | Hansen | |
| 4,460,737 A | 7/1984 | Evans et al. | |
| 4,468,430 A | 8/1984 | Ruede | |
| 4,472,243 A | 9/1984 | Bondoc et al. | |
| 4,473,610 A | 9/1984 | Davis | |
| 4,478,610 A | 10/1984 | Parekh et al. | |
| 4,506,060 A | 3/1985 | White, Sr. et al. | |
| 4,513,045 A | 4/1985 | Bondoc et al. | |
| 4,521,478 A | 6/1985 | Hageman | |
| 4,541,217 A | 9/1985 | Stewart | 52/518 |
| 4,555,543 A | 11/1985 | Effenberger et al. | |
| 4,559,267 A | 12/1985 | Freshwater et al. | |
| 4,560,612 A | 12/1985 | Yau | |
| 4,571,356 A | 2/1986 | White, Sr. et al. | |
| 4,599,258 A | 7/1986 | Hageman | |
| 4,609,709 A | 9/1986 | Yau | |
| 4,610,918 A | 9/1986 | Effenberger et al. | |
| 4,612,238 A | 9/1986 | DellaVecchia et al. | |
| 4,647,496 A | 3/1987 | Lehnert et al. | |
| 4,654,235 A | 3/1987 | Effenberger et al. | |
| 4,664,707 A | 5/1987 | Wilson et al. | |
| 4,669,246 A | 6/1987 | Freeman | 52/408 |
| 4,683,165 A | 7/1987 | Lindemann et al. | |
| 4,717,614 A | 1/1988 | Bondoc et al. | |
| 4,738,884 A | 4/1988 | Algrim et al. | |
| 4,745,032 A | 5/1988 | Morrison | |
| 4,746,560 A | 5/1988 | Goeden | |
| 4,746,565 A | 5/1988 | Bafford et al. | 428/251 |
| 4,755,545 A | 7/1988 | Lalwani | |
| 4,764,420 A | 8/1988 | Gluck et al. | |
| 4,784,897 A | 11/1988 | Brands et al. | |
| 4,810,569 A | 3/1989 | Lehnert et al. | |
| 4,835,004 A | 5/1989 | Kawanishi | |
| 4,837,095 A | 6/1989 | Hageman | |
| 4,870,796 A | 10/1989 | Hart et al. | 52/409 |
| 4,879,173 A | 11/1989 | Randall | |
| 4,889,880 A | 12/1989 | Miller | |
| 4,917,764 A | 4/1990 | Lalwani et al. | |
| D309,027 S | 7/1990 | Noone et al. | |
| 4,944,818 A | 7/1990 | Dybsky et al. | |
| 5,001,005 A | 3/1991 | Blanpied | |
| 5,015,711 A | 5/1991 | Simonet et al. | |
| 5,019,610 A | 5/1991 | Sitz et al. | |
| 5,030,507 A | 7/1991 | Mudge et al. | |
| 5,091,243 A | 2/1992 | Tolbert et al. | 428/253 |
| 5,099,627 A | 3/1992 | Coulton et al. | |
| 5,110,839 A | 5/1992 | Chao | |
| 5,112,678 A | 5/1992 | Gay et al. | |
| 5,148,645 A | 9/1992 | Lehnert et al. | |
| 5,192,366 A | 3/1993 | Nishioka et al. | |
| 5,220,762 A | 6/1993 | Lehnert et al. | |
| 5,232,530 A | 8/1993 | Malmquist et al. | |
| 5,239,802 A | 8/1993 | Robinson | 52/518 |
| 5,318,844 A | 6/1994 | Brandon | |
| 5,334,648 A | 8/1994 | Drews et al. | |
| 5,342,680 A | 8/1994 | Randall | |
| 5,347,785 A | 9/1994 | Terrenzio et al. | |
| 5,369,929 A | 12/1994 | Weaver et al. | |
| 5,371,989 A | 12/1994 | Lehnert et al. | |
| 5,391,417 A | 2/1995 | Pike | |
| 5,393,794 A | 2/1995 | Sperber | |
| 5,397,631 A | 3/1995 | Green et al. | |
| 5,401,588 A | 3/1995 | Garvey et al. | |
| 5,437,717 A | 8/1995 | Doyle et al. | |
| 5,437,923 A | 8/1995 | Kalkanoglu | |
| 5,445,878 A | 8/1995 | Mirous | |
| 5,476,542 A | 12/1995 | Doyle et al. | |
| 5,496,400 A | 3/1996 | Doyle et al. | |
| 5,501,730 A | 3/1996 | Duong et al. | |
| D369,421 S | 4/1996 | Kiik et al. | |
| 5,518,586 A | 5/1996 | Mirous | |
| 5,573,586 A | 11/1996 | Yap et al. | |
| 5,580,376 A | 12/1996 | Hayner | |
| 5,580,378 A | 12/1996 | Shulman | |
| 5,601,680 A | 2/1997 | Kuszaj et al. | |
| 5,601,888 A | 2/1997 | Fowler | |
| 5,604,274 A | 2/1997 | Gallagher et al. | |
| 5,611,186 A | 3/1997 | Weaver | |
| 5,665,442 A | 9/1997 | Andersen et al. | |
| 5,666,776 A | 9/1997 | Weaver et al. | |
| 5,687,517 A | 11/1997 | Wiercinski et al. | |
| 5,698,304 A | 12/1997 | Brandon et al. | |
| 5,717,012 A | 2/1998 | Bondoc et al. | |
| 5,718,785 A | 2/1998 | Randall | |
| 5,776,841 A | 7/1998 | Bondoc et al. | |
| 5,784,845 A | 7/1998 | Imeokparia et al. | 52/408 |
| 5,795,380 A | 8/1998 | Billings et al. | |
| 5,822,943 A | 10/1998 | Frankoski et al. | 52/518 |
| 5,884,446 A | 3/1999 | Hageman | |
| 5,965,257 A | 10/1999 | Ahluwalia | |
| 6,014,847 A | 1/2000 | Phillips | |
| 6,145,265 A | 11/2000 | Malarkey et al. | 52/555 |
| 6,148,578 A | 11/2000 | Nowacek et al. | |
| 6,151,859 A | 11/2000 | Nowacek | |
| 6,199,338 B1 * | 3/2001 | Hudson et al. | 52/518 |
| 6,289,648 B1 | 9/2001 | Freshwater et al. | |

OTHER PUBLICATIONS

Product description for Tough–Guard® Roof Eave and Valley Protector reprinted from the Georgia–Pacific Web site, the URL of which is http://www.gp.com/roofing/pdf/041700.pdf.

Application Ser. No. 09/401,392: Freshwater et al., filed Sep. 22, 1999.

Application Ser. No. 09/663,255: Kiik et al., filed Sep. 15, 2000.

Application Ser. No. 09/897,308: Kiik et al., filed Jul. 2, 2001.

"Ce–DUR™ Shake Installation Guide" excerpt describing Ce–DUR Shake Roof Application.

"Using DURATHON to re–engineer the residential roofing industry" by ENDUR–ALL Technologies, Inc.

* cited by examiner

ROOFING COMPOSITE

CROSS REFERENCE TO RELATED APPLICATIONS

This application is a continuation-in-part of pending U.S. patent application Ser. No. 09/663,255, filed on Sep. 15, 2000 now U.S. Pat. No. 6,586,353, which claims priority under 35 U.S.C. §119(e) to Provisional Patent Application No. 60/168,057, filed on Nov. 30, 1999; a continuation-in-part of U.S. patent application Ser. No. 09/897,308, filed on Jul. 2, 2001; and a continuation-in-part of U.S. patent application Ser. No. 10/212,012, filed on Aug. 2, 2002, which claims priority under 35 U.S.C. §119(e) to Provisional Patent Application No. 60/310,031, filed Aug. 3, 2001. This application also claims priority under 35 U.S.C. §119(e) to Provisional Patent Application No. 60/331,808, filed on Nov. 20, 2001.

TECHNICAL FIELD OF THE INVENTION

The present invention relates generally to a roofing composite comprised of a roofing material and an interply material attached thereto. The roofing material may be roofing shingles or roll roofing and the interply material is water resistant.

BACKGROUND

Roofing products are often divided into three broad groups: shingles, roll roofing and underlayment. Shingles and roll roofing typically function as outer roof coverings designed to withstand exposure to weather and the elements. Asphalt shingles and roll roofing generally contain the same basic components which provide protection and long term wear associated with asphalt roofing products. In a typical roof installation, the underlayment is first laid on top of the roof deck, and then the outer roofing covering (e.g., shingles or roll roofing) is attached on top of the underlayment.

Asphalt shingles (sometimes also referred to as composite shingles) are one of the most commonly used roofing materials. Asphalt shingles may include an organic felt or fiberglass mat base on which an asphalt coating is applied. The organic felt or fiberglass mat base gives the asphalt shingle the strength to withstand manufacturing, handling, installation and servicing activities, and the asphalt coating provides resistance to weathering and stability under temperature extremes. An outer layer of mineral granules is also commonly applied to the asphalt coating to form a weather surface which shields the asphalt coating from the sun's rays, adds color to the final product, and provides additional fire resistance.

Asphalt shingles are typically manufactured as strip or three tab shingles, laminated shingles, interlocking shingles, and large individual shingles in a variety of weights and colors. Even though asphalt shingles offer significant cost, service life, and fire resistance advantages over wood shingles, wood shingles are sometimes preferred due to their pleasing aesthetic features, such as their greater thickness as compared to asphalt shingles, which may result in a more pleasing, layered look for a roof.

Various asphalt shingles have been developed to provide an appearance of thickness comparable to wood shingles. Examples of such asphalt shingles are shown in U S. Pat. No. 5,232,530 entitled "Method of Making a Thick Shingle"; U.S. Pat. No. 3,921,358 entitled "Composite Shingle"; U.S. Pat. No. 4,717,614 entitled "Asphalt Shingle"; and U.S. Pat. Des. No. D309,027 entitled "Tab Portion of a Shingle." Some laminated asphalt shingles simulate the appearance of slate roofing shingles. See U.S. Pat. No. Des. 369,421. Each of the patents mentioned in this paragraph is incorporated by reference herein in its entirety.

In addition to these patents, significant improvements in the art of roofing shingles have been disclosed and patented in U.S. Pat. Nos. 5,369,929; 5,611,186; and 5,666,776; each entitled "Laminated Roofing Shingle", issued to Weaver et al. and assigned to the Elk Corporation of Dallas. These patents disclose laminated roofing shingles developed to create the illusion of thickness or depth on a relatively flat surface by including a backer strip having striations of color beneath and between tabs wherein the color is uniform within the tab. Each of these three patents is also incorporated by reference herein in its entirety.

Additional improvements include the use of larger shingles having a buttlap section of greater than about 7 inches to provide a more pleasing appearance and a greater visual impact by providing enhanced dimensionality, as disclosed in pending U.S. patent application Ser. No. 09/401,392 entitled "Laminated Roofing Shingle" and filed on Sep. 22, 1999, which is incorporated herein by reference in its entirety. Shingles typically have a buttlap section, a part of which is exposed to the environment, and a headlap section, which is covered by the buttlap section of the shingle in the next row above. The headlap section is typically wide in order to (i) improve weatherproofing, (ii) insure that a majority of the roof is covered by at least one layer of buttlap section and at least one layer of headlap section, and (iii) aid in the production and handling of the shingle. Accordingly, heretofore the production of shingles having a greater exposure area (e.g., having a buttlap section of greater than 7 inches) has required retooling of existing machinery because standard equipment typically produces a shingle having a width of about 13.25 inches. The present invention enables the production on existing equipment lines of a variety of roofing shingles providing for enhanced exposure while still enabling the achievement of Class A fire resistance ratings.

SUMMARY OF THE INVENTION

The present invention is a roofing composite including a roofing material and an interply material attached to the roofing material. The interply material is attached adjacent to an edge of the roofing material. The interply material is scored to permit a major portion of the interply material to be folded away from the roofing material for application to a roof.

The roofing composite of the present invention may include roofing material such as laminated asphalt shingles or three tab asphalt shingles or roll roofing. The interply material is comprised of a water resistant material and preferably a water and fire resistant material. The interply material may be a coated structural article such as those disclosed in U.S. Pat. No. 5,965,257 which is incorporated herein by reference in its entirety. Such an interply material may be comprised of a substrate having an ionic charge coated with a coating having essentially the same ionic charge. The coating consists essentially of a filler material and a binder material. The binder material bonds the filler material together and to the substrate. The coating does not bleed through the substrate. The interply material may be from 10% to 25% by weight glass fibers and the coating may be from 84% to 96% filler selected from the group consisting of fly ash, charged calcium carbonate, ceramic microspheres and mixtures thereof, and from 16% to 4% acrylic latex binder material.

Alternatively, the interply material may be comprised of a substrate having an ionic charge coated on one side with a coating having essentially the same ionic charge. Again, the coating consists essentially of a filler material and a binder material and the binder material bonds the filler material together and to the substrate. The coating does not bleed through the substrate. The substrate is covered on the other side with a water vapor impermeable material selected from the group consisting essentially of metal foils and preformed plastic films. Examples of such materials are provided in pending U.S. patent application Ser. No. 09/897,308 entitled "Water Vapor Barrier Structural Article" and filed on Jul. 2, 2001, which is incorporated herein by reference in its entirety. The water vapor impermeable material is attached to the coated substrate with an adhesive.

Additionally, the interply material may be comprised of a substrate having an ionic charge coated on both sides with a coating having essentially the same ionic charge. The coating again consists essentially of a filler material and a binder material and the binder material bonds the filler material together and to the substrate. The coating does not bleed through the substrate. One side of the coated substrate is covered with a water vapor impermeable material selected from the group consisting essentially of metal foils and preformed plastic films. The water vapor impermeable material is attached to the coated substrate with an adhesive. Alternatively, one side of the coated substrate may be covered with a metal foil water vapor barrier material and the other side of the coated substrate may be covered with a preformed plastic film water vapor impermeable material. Both water vapor impermeable materials may be attached to the coated substrate with an adhesive. Further, both sides of the coated substrate may be coated with the same water vapor impermeable material, either a metal foil or a preformed plastic film, which may be attached to the coated substrate with an adhesive. In such embodiments, the coating may be from 84% to 96% filler selected from the group consisting of fly ash, charged calcium carbonate, ceramic microspheres and mixtures thereof and from 16% to 4% acrylic latex binder material.

The adhesive for the embodiments described above is selected from the group consisting essentially of low density polyethylene, high density polyethylene, polyethylene-vinyl acetate, polypropylene, polyvinylidene chloride, nylon, polyester, asphaltic adhesive, and mixtures thereof.

In the roofing material of the present invention, alternative interply materials may also be employed. One such material is comprised of a roll roofing product including an organic or inorganic substrate such as fiberglass or mineral wool. The substrate may be coated with asphaltic material on which mineral surfacing materials, such as granules, sand, and slag are then applied. Another such interply material is comprised of asphalt impregnated felt underlayment material.

BRIEF DESCRIPTION OF THE DRAWINGS

Exemplary embodiments of the present invention will now be described in detail with reference to the accompanying drawings in which.

DETAILED DESCRIPTION OF THE INVENTION

The roofing composite material of the present invention provides the aesthetic benefits of large shingles without requiring the retooling of existing machinery. Accordingly, these materials can be produced by adjusting existing production processes with little or no capital expenditures. The roofing composite material of the present invention also weighs less than a conventional shingle of equivalent exposure size, thus reducing freight costs and roof loads.

The roofing composite includes a roofing material and an interply material attached to the roofing material. The interply material is attached adjacent to an edge of the roofing material and the interply material is scored to permit a major portion of the interply material to be folded away from the roofing material for application to a roof.

Figure 1:
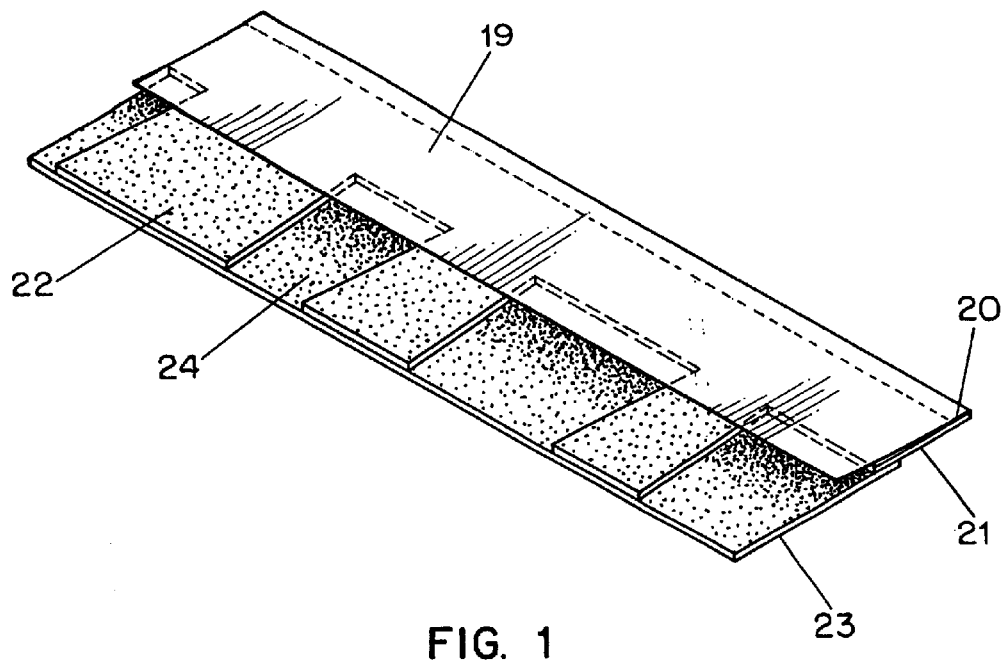
FIG. 1 is a perspective view of the roofing composite of the present invention before the interply material is folded away from a laminated shingle.
Figure 2:
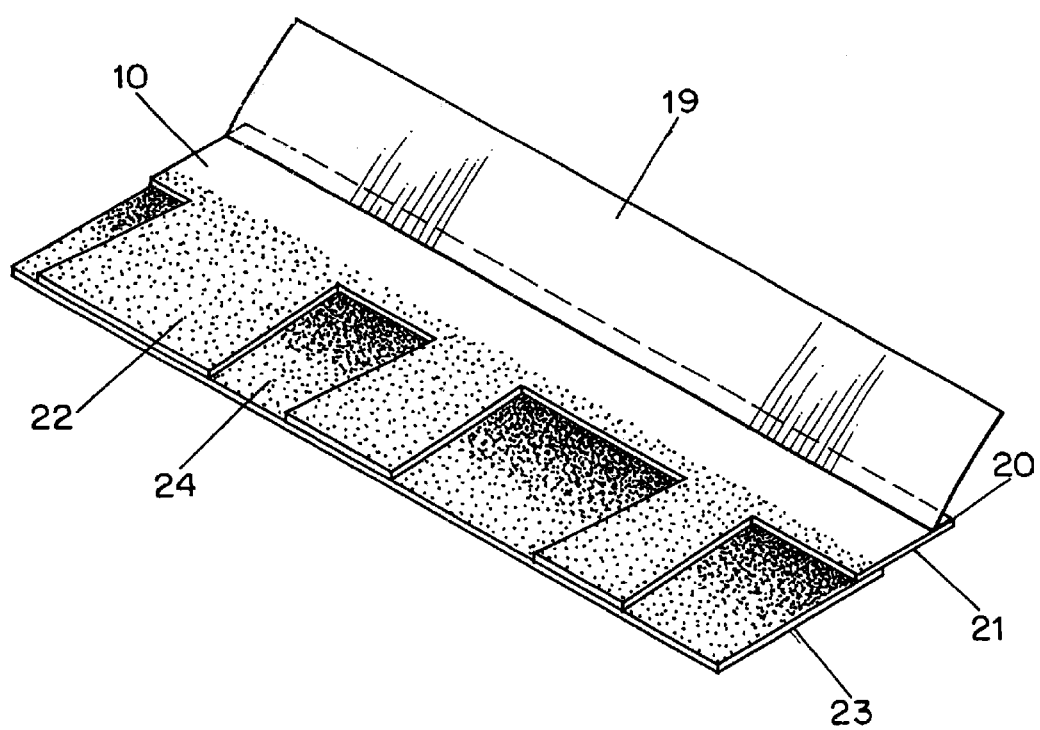
FIG. 2 is a perspective view of the roofing composite of the present invention as the interply material is being folded away from the laminated shingle.
Figure 3:
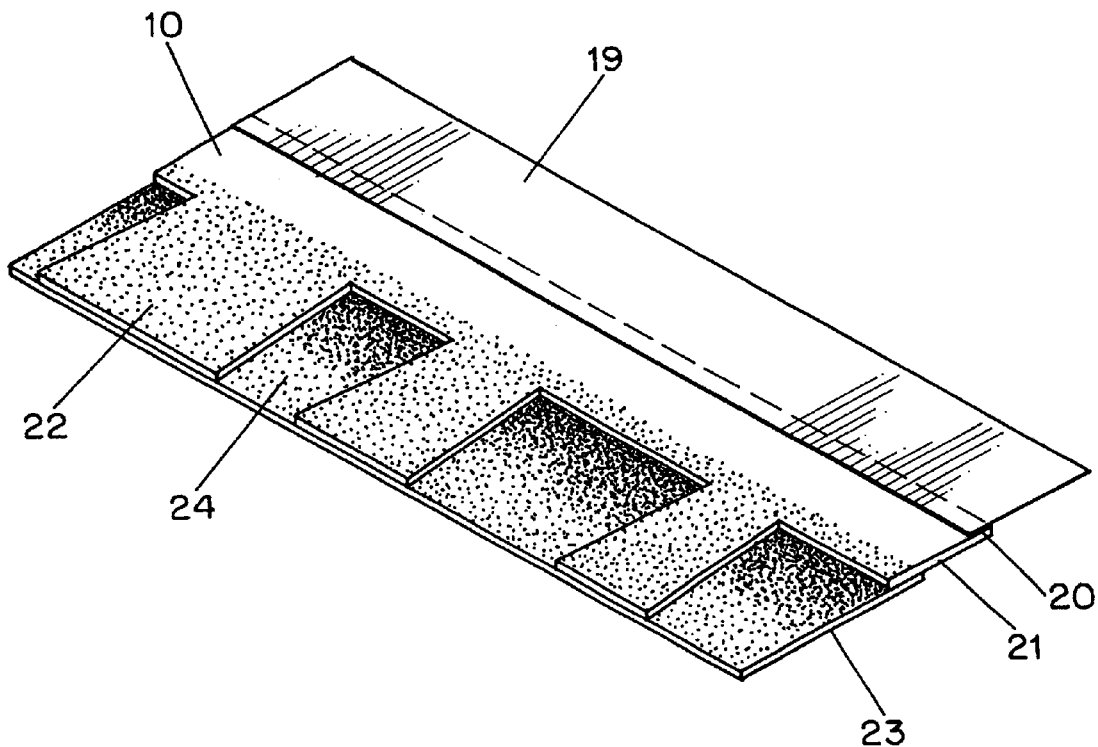
FIG. 3 is a perspective view of the roofing composite of the present invention showing the interply material folded away from the laminated shingle for application to a roof.
Figure 4:
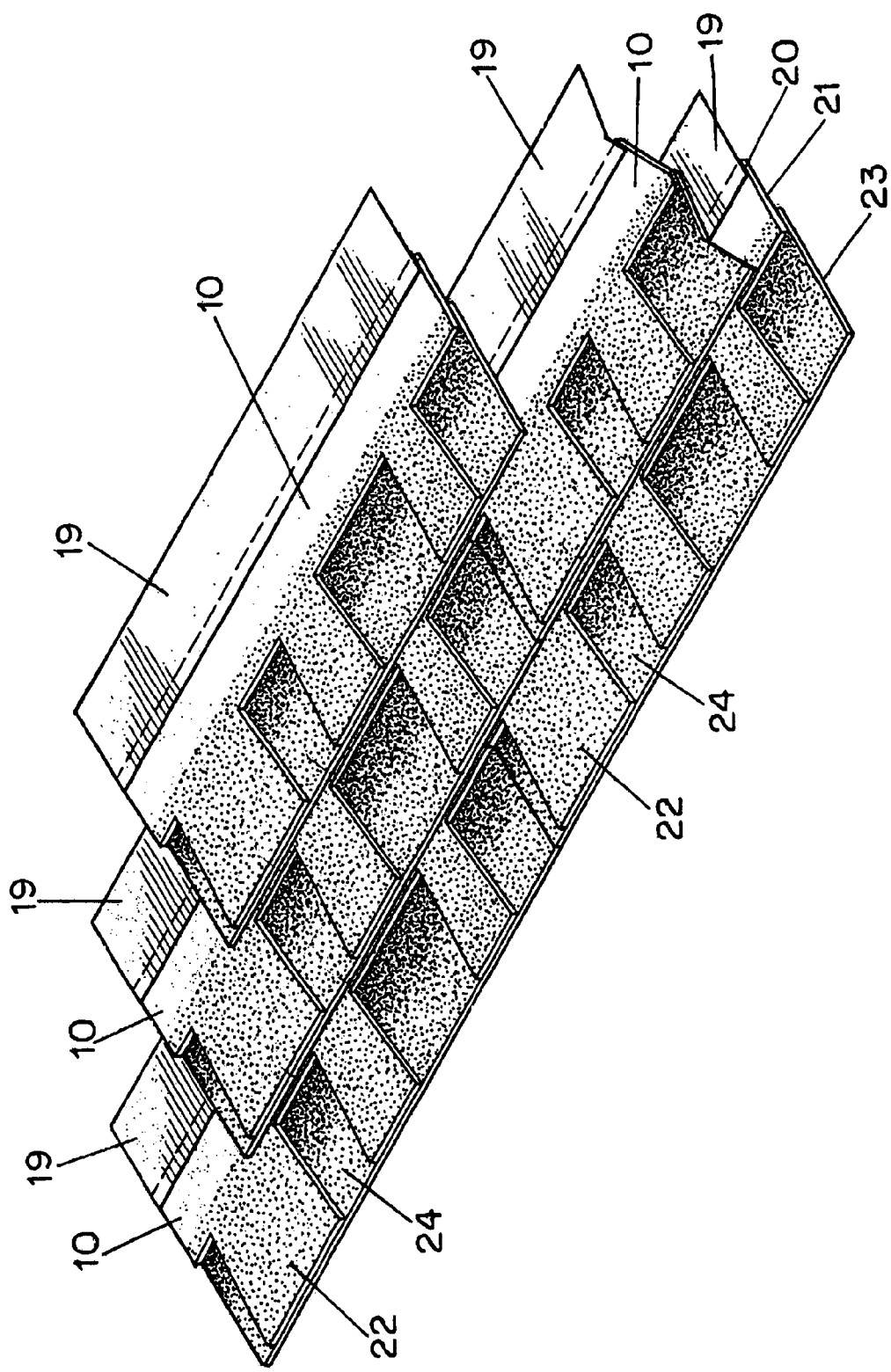
FIG. 4 is a perspective view of a partial roofing section covered with roofing composite incorporating the embodiment of FIG. 1 of the present invention.

In one embodiment of the invention, as illustrated in FIGS. 1–3, the roofing composite includes a laminated shingle 20 which comprises a first shingle sheet 10 having a headlap section 21 and a buttlap section including a plurality of tabs 22 which are spaced apart to define one or more openings between the tabs. The headlap section 21 is adhesively attached to an interply 19. Each of the tabs 22 has a relatively uniform color throughout the tab. A second shingle sheet 23 is attached to the underside of the first shingle sheet 10 and has portions 24 exposed through the openings between the tabs 22. The second shingle sheet 23 has at least first, second, and third horizontal striations thereon across at least partial portions 24 of the second sheet which are exposed through said openings between the tabs 22. Such a laminated shingle is disclosed in U.S. Pat. Nos. 5,369,929; 5,611,186 and 5,666,776. The widths of the striations on the second shingle sheet 23 of each shingle may be approximately equal or may vary as described in U.S. Provisional Patent Application No. 60/310,031 filed on Aug. 3, 2001 which is incorporated herein by reference in its entirety. FIGS. 1–3 show the interply before being folded away from the laminated shingle, as it is being folded away, and when it is completely folded away, respectively. FIG. 4 shows a partial roofing section covered with roofing composite incorporating the laminated shingle of FIG. 3 of the present invention.

Figure 5:
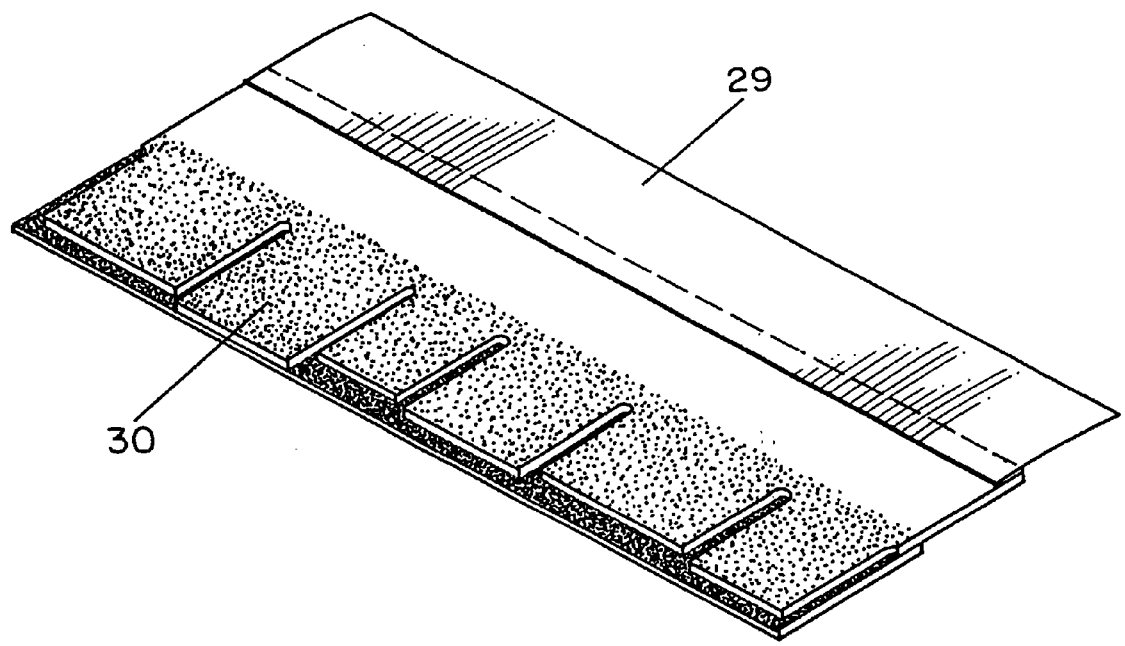
FIG. 5 is a perspective view of the roofing composite of the present invention showing the interply material folded away from a second laminated shingle.
Figure 6:
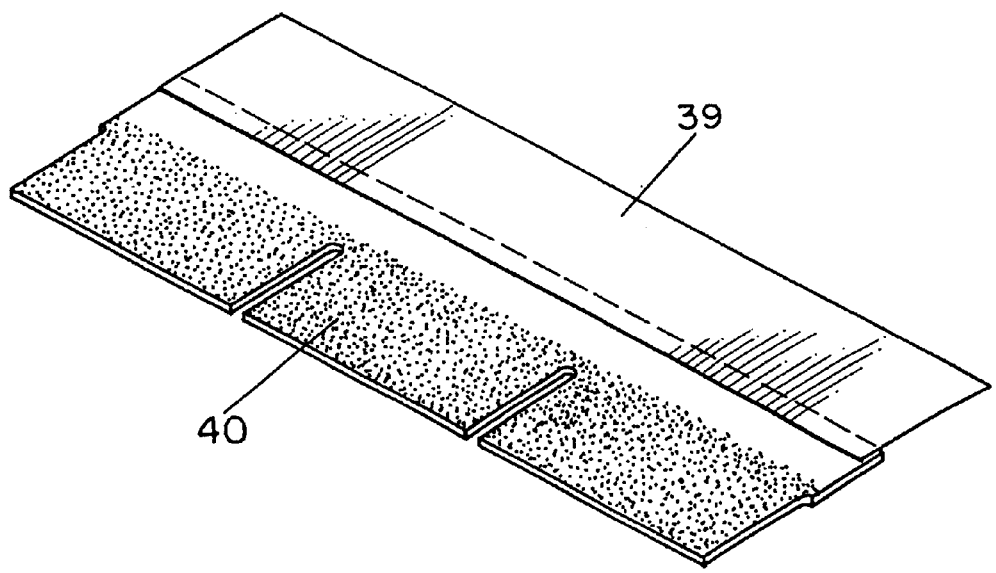
FIG. 6 is a perspective view of the roofing composite of the present invention showing the interply material folded away from a three tab shingle.

The roofing composites of the present invention may alternatively include laminated shingles such as those disclosed in U.S. Patent No. Des. 369,421. Such composites are depicted in FIG. 5 herein, which shows interply 29 folded away from the first shingle sheet 30 of the laminated shingle. Moreover, the roofing composites of the present invention may include three tab asphalt shingles. Such composites are depicted in FIG. 6 herein, which shows interply 39 folded away from the three tab shingle 40. The roofing composites shown in FIG. 5 and in FIG. 6 are prepared in analogous fashion to the roofing composite shown in FIGS. 1–4 herein. In particular, with reference to FIG. 5, the interply material 29 is adhered to the headlap section of the laminated shingle and scored such that it can be folded away from the first shingle sheet 30 of the shingle. Similarly, in FIG. 6, the interply material 39 is adhered to the headlap section of the three tab or strip shingle and scored such that it can be folded away from the shingle 40.

Figure 7:
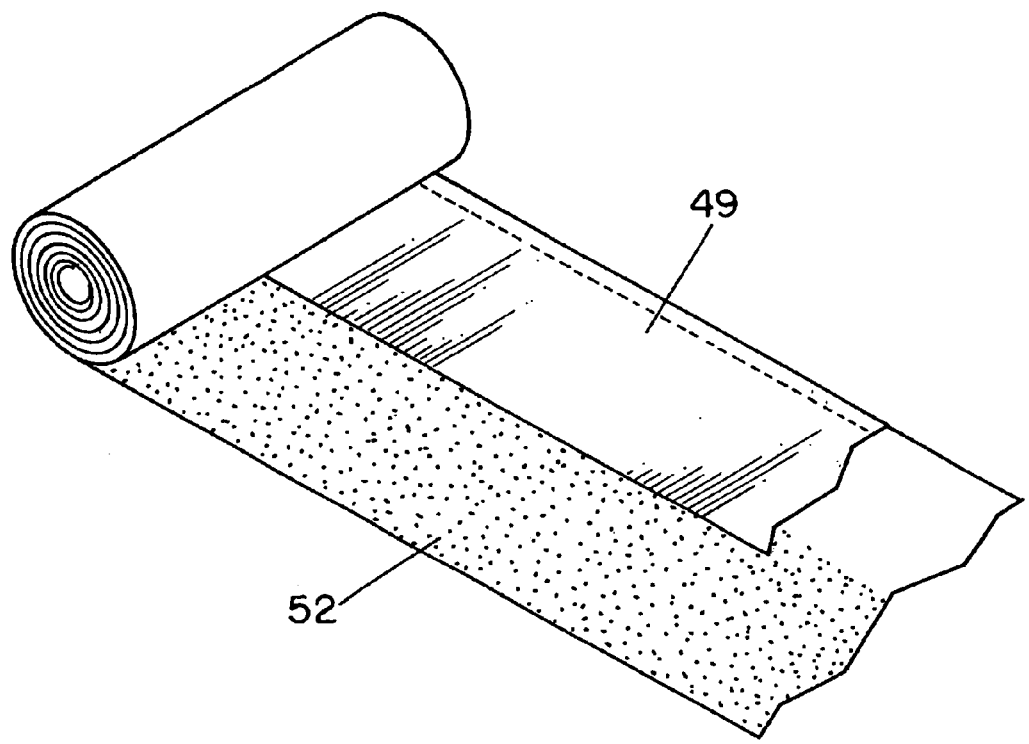
FIG. 7 is a perspective view of a first embodiment of the roofing composite of the present invention before the interply material is folded away from roll roofing material.
Figure 9:
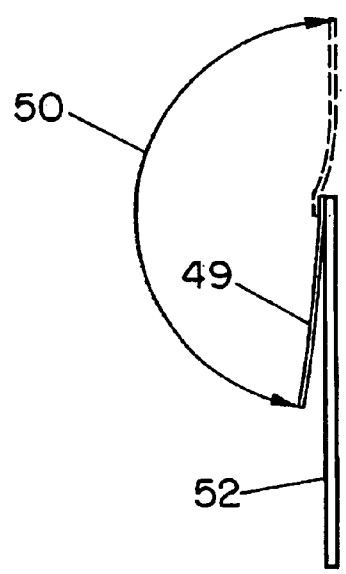
FIG. 9 is a side-view of the roofing composite of the embodiment of FIG. 7 of the present invention as the interply material is being folded away from the roll roofing material.
Figure 8:
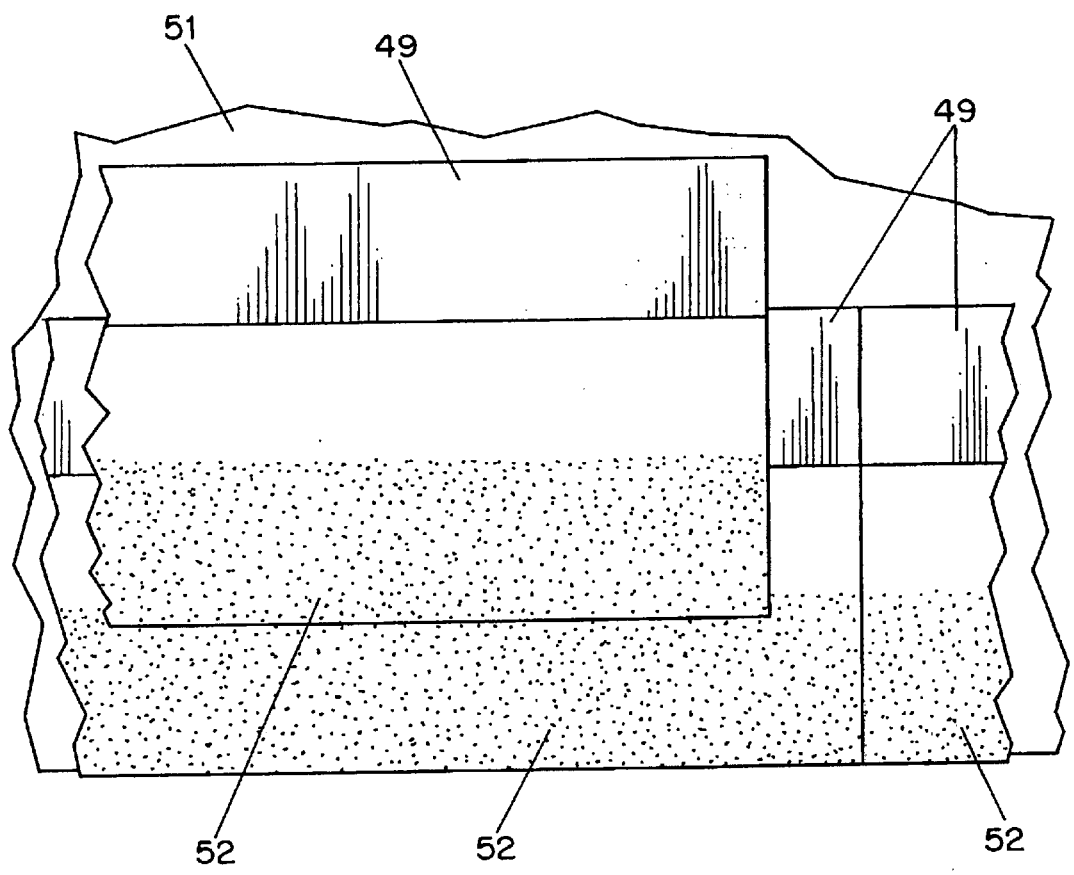
FIG. 8 is a top view of a partial roofing section covered with roofing composite incorporating the FIG. 7 embodiment of the present invention.
Figure 10:
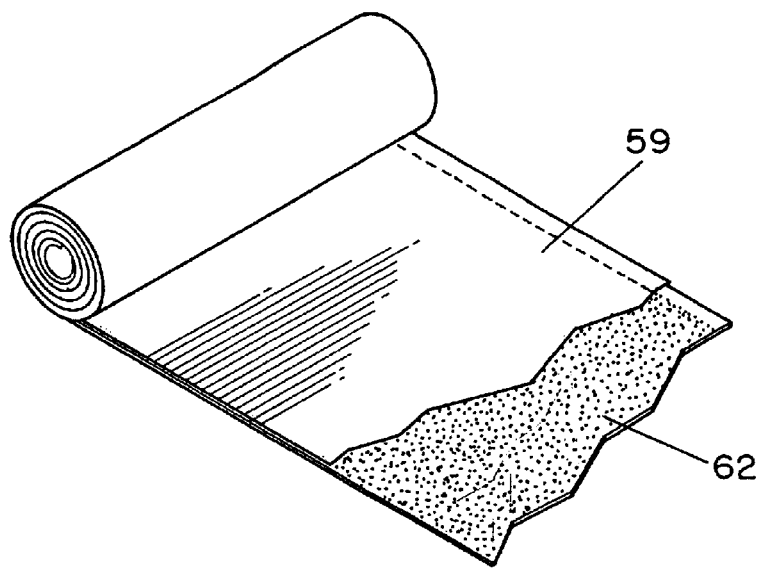
FIG. 10 is a perspective view of a second embodiment of the roofing composite of the present invention before the interply material is folded away from the roll roofing material.
Figure 11:
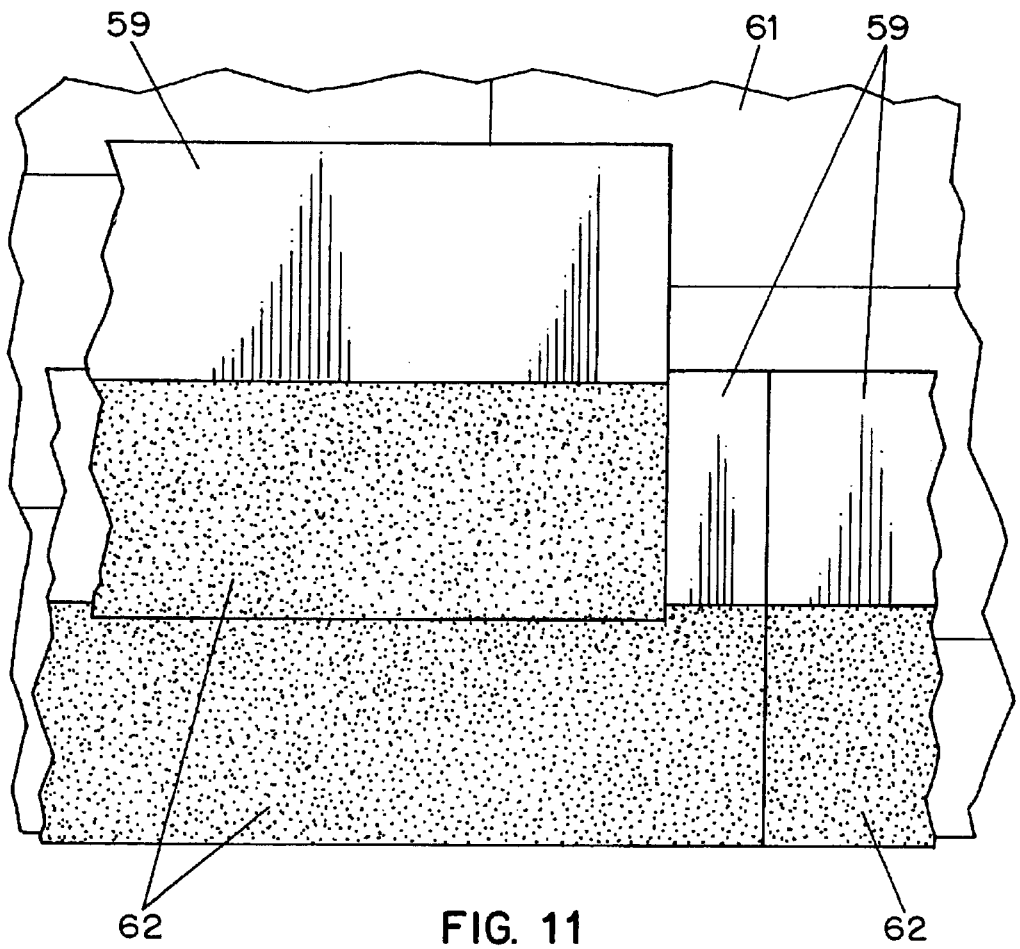
FIG. 11 is a top view of a partial roofing section covered with roofing composite incorporating the FIG. 10 embodiment of the present invention.

Further, the roofing composites of the present invention may include roll roofing material such as depicted in FIGS. 7–11 herein. In particular, FIG. 7 shows a first embodiment of a roofing composite before the interply material 49 is folded away from the roll roofing material 52. FIG. 9 shows the roofing composite in which the interply material 49 is folded away through an arc 50 from the roll roofing material 52. FIG. 8 shows a roofing section including sheathing 51 covered with the roofing composite of FIG. 7. FIG. 10 shows a second embodiment of a roofing composite before the interply material 59 is folded away from roll roofing material 62, and FIG. 11 shows a roofing section including sheathing 61 covered with the roofing composite of FIG. 10.

In the embodiments of the roofing material summarized above, the interply material may be comprised of a water resistant material, and preferably a water and fire resistant material. The interply material may be comprised of a substrate such as fiberglass, having an ionic charge coated with a coating having essentially the same ionic charge. The coating consists essentially of a filler material and a binder material. The binder material bonds the filler material together and to the substrate. The coating does not bleed through the substrate. Such an interply material is described in U.S. Pat. No. 5,965,257, the entirety of which is incorporated herein by reference, and is sold by Elk Corporation of Dallas, Tex. as VersaShield®. The interply material may be from 10% to 25% by weight glass fibers and the coating may be from 84% to 96% filler selected from the group consisting of fly ash, charged calcium carbonate, ceramic microspheres and mixtures thereof, and from 16% to 4% acrylic latex binder material.

Alternatively, the interply material may be comprised of a substrate having an ionic charge coated on one side with a coating having essentially the same ionic charge. The coating again consists essentially of a filler material and a binder material and the binder material bonds the filler material together and to the substrate. The coating does not bleed through the substrate. The substrate is covered on the other side with a water vapor impermeable material selected from the group consisting essentially of metal foils and preformed plastic films. The water vapor impermeable material is attached to the coated substrate with an adhesive. Elk Corporation markets materials including the preformed plastic film as VersaShield® Vapor Seal-I™ and Elk markets materials including the metal foils as VersaShield® ThermoClad-I™. Such materials are described in pending U.S. patent application Ser. No. 09/897,308, the entirety of which is incorporated by reference herein.

Additionally, the interply material may be comprised of a substrate having an ionic charge coated on both sides with a coating having essentially the same ionic charge. The coating again consists essentially of a filler material and a binder material and the binder material bonds the filler material together and to the substrate. The coating does not bleed through the substrate. One side of the coated substrate is covered with a water vapor impermeable material selected from the group consisting essentially of metal foils and preformed plastic films. The water vapor impermeable material is attached to the coated substrate with an adhesive. Alternatively, one side of the coated substrate may be covered with a metal foil water vapor barrier material and the other side of the coated substrate may be covered with a preformed plastic film water vapor impermeable material. Both water vapor impermeable materials may be attached to the coated substrate with an adhesive. Further, both sides of the coated substrate may be coated with either a metal foil water vapor impermeable material or a preformed plastic film water vapor impermeable material which may be attached to the coated substrate with an adhesive. In such embodiments, the coating may be from 84% to 96% filler selected from the group consisting of fly ash, charged calcium carbonate, ceramic microspheres and mixtures thereof and from 16% to 4% acrylic latex binder material. Alternatively, a water proof coating may be used instead of the impermeable films listed above.

The adhesive for the embodiments described above is selected from the group consisting essentially of low density polyethylene, high density polyethylene, polyethylene-vinyl acetate, polypropylene, polyvinylidene chloride, nylon, polyester and mixtures thereof. Alternatively, an asphaltic adhesive, such as an asphaltic adhesive similar to standard laminating adhesives, may be used.

In the roofing material of the present invention, alternative interply materials may also be employed. One such material is comprised of a roll roofing product including a fiberglass substrate coated with asphaltic material and mineral surfacing materials. Such interply materials include Ridglass TG-2 sold by Ridglass Shingle Manufacturing Co. of Fresno, Calif.; OCF Roll Roofing sold by Owens Corning of Toledo, Ohio and Z-Base sold by Black Warrior Roofing, Inc. of Tuscaloosa, Ala. Another such interply material is comprised of asphalt impregnated felt underlayment material. That type of interply material is sold as Fontana Vulca-Seal 40 by Fontana Paper of Fontana, Calif. A non-asphaltic barrier product is available from Vliepa of Bracht, Germany. Materials that satisfy the requirements of ASTM D226 Type I or II, ASTM 04601 Type I or II, ICBO AC165 products, ICBO AC160 products, ASTM 04897 Type I or II, ASTM D3909, D2178, D249, D224, D371, D1970, D6757 and products useful in the plastic sheathing industry may also be suitable interply materials. Suitable interply materials which satisfy the requirements of ASTM D1970-01 include JM Sure Grip and JM Nord Shield, available from Johns Manville, and GAF Weatherwatch, available from GAF.

The interply material may be of any width suitable to the application. Preferably, the width of the interply material is the same as or less than the width of the roofing shingle. For example, when an exemplary laminated shingle having a width of 13.25 inches is utilized in the roofing material, the interply material can have a width preferably of about 13.25 inches, or preferably about 7 inches. Alternatively, the width of the interply material may be greater than the width of the roofing shingle. The interply material may be attached to the roofing shingle by any suitable means, for instance, by mechanical means such as stapling or with an adhesive such as the standard modified asphalts that are used for laminating shingle fabric together to form laminated shingles, contact cement, glue (preferably hot glue), plastic (preferable hot plastic), or low density polyethylene, high density polyethylene, polyethylene-vinyl acetate, polypropylene, polyvinylidene chloride, nylon, polyester, asphaltic adhesive and mixtures thereof.

It is believed that the interply material can effectively replace a large headlap section of a shingle, which was typically believed to be needed for effective protection from the elements. Accordingly, the interply material can be made of any weather proofing material known in the art. Preferably, the interply material is made of material that is both fire and water resistant.

Although the present invention has been described with reference to certain referred embodiments, various modifications, alterations, and substitutions will be apparent to those skilled in the art without departing from the spirit and scope of the invention, as defined by the appended claims.

We claim:

1. A roofing composite comprising a roofing material selected from the group consisting of asphalt roofing shingles and roll roofing and an interply material attached to said roofing material, wherein said interply material is attached adjacent to an edge of said roofing material and wherein said interply material is scored to permit a major portion of the interply material to be folded away from said roofing material for application to a roof.

2. The roofing composite according to claim 1 wherein said shingle is laminated.

3. The roofing composite according to claim 1 wherein said shingle is a three tab shingle.

4. The roofing composite according to claim 1 wherein said roofing material is roll roofing.

5. The roofing material according to claim 1 wherein the interply material is comprised of a water resistant material.

6. The roofing composite according to claim 1 wherein said interply material is comprised of a substrate having an ionic charge coated with a coating having essentially the same ionic charge wherein said coating consists essentially of a filler material and a binder material and wherein said binder material bonds the filler material together and to the substrate and wherein said coating does not bleed through said substrate.

7. The roofing composite according to claim 6 wherein said interply material is from 10% to 25% by weight glass fibers and said coating is from 84% to 96% filler selected from the group consisting of fly ash, charged calcium carbonate, ceramic microspheres and mixtures thereof, and from 16% to 4% acrylic latex binder material.

8. The roofing composite according to claim 1 wherein said interply material is comprised of a substrate having an ionic charge,
   (a) coated on one side with a coating having essentially the same ionic charge wherein said coating consists essentially of a filler material and a binder material and wherein said binder material bonds the filler material together and to the substrate and wherein said coating does not bleed through said substrate; and
   (b) covered on the other side with a water vapor impermeable material selected from the group consisting essentially of metal foils and preformed plastic films; wherein said water vapor impermeable material is attached to said coated substrate with an adhesive.

9. The roofing composite according to claim 1 wherein said interply material is comprised of a substrate having an ionic charge coated on both sides with a coating having essentially the same ionic charge wherein said coating consists essentially of a filler material and a binder material and wherein said binder material bonds the filler material together and to the substrate and wherein said coating does not bleed through said substrate.

10. The roofing composite according to claim 9 wherein one side of said coated substrate is covered with a water vapor impermeable material selected from the group consisting essentially of metal foils and preformed plastic films and wherein said water vapor impermeable material is attached to said coated substrate with an adhesive.

11. The roofing composite according to claim 9 wherein one side of said coated substrate is covered with a metal foil water vapor barrier material and the other side of said coated substrate is covered with a preformed plastic film water vapor impermeable material; and wherein both water vapor impermeable materials are attached to said coated substrate with an adhesive.

12. The roofing composite according to claim 9 wherein both sides of the coated substrate are coated with a metal foil water vapor impermeable material and wherein said water vapor impermeable material is attached to said coated substrate with an adhesive.

13. The roofing composite according to claim 9 wherein both sides of the coated substrate are coated with a preformed plastic film water vapor impermeable material and wherein said water vapor impermeable material is attached to said coated substrate with an adhesive.

14. The roofing composite according to claim 8, 9, 10, 11, 12, or 13 wherein said adhesive is selected from the group consisting essentially of low density polyethylene, high density polyethylene, polyethylene-vinyl acetate, polypropylene, polyvinylidene chloride, nylon, polyester, asphaltic adhesives and mixtures thereof.

15. The roofing composite according to claim 14 wherein said coating is from 84% to 96% filler selected from the group consisting of fly ash, charged calcium carbonate, ceramic microspheres and mixtures thereof and from 16% to 4% acrylic latex binder material.

16. The roofing composite according to claim 9 wherein one side of said coated substrate is covered with a water proof coating.

17. The roofing composite according to claim 5 wherein said interply material is comprised of a roll roofing product comprising a fiberglass substrate coated with asphaltic material and mineral surfacing materials.

18. The roofing composite according to claim 5 wherein said interply material is comprised of asphalt impregnated felt underlayment material.

19. The roofing composite according to claim 1 wherein said interply material is attached to said roofing material with an adhesive.

20. The roofing composite according to claim 19 wherein the adhesive is selected from the group consisting of asphalt, contact cement, glue, plastic, of low density polyethylene, high density polyethylene, polyethylene-vinyl acetate, polypropylene, polyvinylidene chloride, nylon, polyester and mixtures thereof.

21. The roofing composite according to claim 1 wherein said interply material is mechanically attached to said roofing material.

* * * * *